United States Patent
Alzayer et al.

(10) Patent No.: US 11,867,862 B2
(45) Date of Patent: Jan. 9, 2024

(54) METHOD FOR VALIDATING ROCK FORMATIONS COMPACTION PARAMETERS USING GEOMECHANICAL MODELING

(71) Applicant: SAUDI ARABIAN OIL COMPANY, Dhahran (SA)

(72) Inventors: Yaser Abdullah Alzayer, Dhahran (SA); Nikolaos A. Michael, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 23 days.

(21) Appl. No.: 17/238,824

(22) Filed: Apr. 23, 2021

(65) Prior Publication Data

US 2022/0342105 A1     Oct. 27, 2022

(51) Int. Cl.
*G01V 1/50*     (2006.01)
*E21B 49/00*     (2006.01)
(Continued)

(52) U.S. Cl.
CPC .............. *G01V 1/50* (2013.01); *E21B 49/00* (2013.01); *G01V 1/306* (2013.01); *G01V 99/005* (2013.01);
(Continued)

(58) Field of Classification Search
CPC ........ G01V 1/50; G01V 1/306; G01V 99/005; G01V 2210/624; G01V 2210/66; E21B 49/00; E21B 2200/20
See application file for complete search history.

(56) References Cited

U.S. PATENT DOCUMENTS 6,246,963 B1    6/2001    Cross et al.
6,754,588 B2    6/2004    Cross et al.
(Continued)

FOREIGN PATENT DOCUMENTS

CN        110609319 A     12/2019
WO    2010047859 A1     4/2010
(Continued)

OTHER PUBLICATIONS

Alzayer et al. ("3D Reservoir-Scale Forward Geomechanical Modeling of Differential Compaction Fractures." Paper presented at the SPE Middle East Oil and Gas Show and Conference, Manama, Bahrain, Mar. 2019. doi: https://doi.org/10.2118/195079-MS) (Year: 2019).*

(Continued)

*Primary Examiner* — Daniel R Miller
*Assistant Examiner* — Christian T Bryant
(74) *Attorney, Agent, or Firm* — Osha Bergman Watanabe & Burton LLP (57) ABSTRACT

A method is claimed that includes obtaining a measured present-day value of at least one parameter for each member of a set of unvalidated geological layers arranged in order of increasing depth and iteratively selecting a member of the set as a current layer. For each current layer in turn, the method further determines an estimated archaic value of at least one parameter of the current layer based on its measured present-day value by applying an alternating cycle of decompaction followed by geomechical modeling to predict a present-day value of the parameter of the current layer based on its estimated archaic value. The method still further determines a validated archaic value of at least one parameter of each current layer based on a difference between the predicted and the measured present-day values. A non- (Continued)

transitory computer readable medium storing instructions for validating the archaic value for each layer is claimed.

16 Claims, 9 Drawing Sheets

(51) Int. Cl.
    *G01V 1/30*     (2006.01)
    *G01V 99/00*     (2009.01)

(52) U.S. Cl.
    CPC .... *E21B 2200/20* (2020.05); *G01V 2210/624* (2013.01); *G01V 2210/66* (2013.01)

(56) References Cited

U.S. PATENT DOCUMENTS

| | | | |
|---|---|---|---|
| 7,043,367 | B2 | 5/2006 | Granjeon |
| 7,925,481 | B2 | 4/2011 | Van Wagoner et al. |
| 8,457,940 | B2 | 6/2013 | Xi et al. |
| 8,838,428 | B2 | 9/2014 | Tapscott et al. |
| 8,972,233 | B2 | 3/2015 | Bohacs et al. |
| 10,302,813 | B2 | 5/2019 | Minguez et al. |
| 10,310,137 | B1 | 6/2019 | Mallet |
| 10,422,922 | B2 | 9/2019 | Xu et al. |
| 10,590,762 | B2 | 3/2020 | Yogeswaren |
| 10,705,237 | B2* | 7/2020 | Thore .................. G01V 1/308 |
| 10,705,252 | B2 | 7/2020 | Kuhn et al. |
| 10,713,398 | B2 | 7/2020 | Mezghani et al. |
| 2010/0211367 | A1* | 8/2010 | Koutsabeloulis ...... G01V 11/00 703/6 |
| 2012/0029895 | A1* | 2/2012 | Xi ........................ G01V 99/005 703/10 |
| 2014/0278298 | A1* | 9/2014 | Maerten ............... G01V 99/005 703/2 |
| 2019/0080122 | A1* | 3/2019 | Camargo ................. G06G 7/48 |
| 2020/0225383 | A1 | 7/2020 | Mallet et al. |

FOREIGN PATENT DOCUMENTS

| | | |
|---|---|---|
| WO | 2014/149802 A1 | 9/2014 |
| WO | 2019/055167 A1 | 3/2019 |
| WO | 2020123073 A1 | 6/2020 |
| WO | 2021/048597 A1 | 3/2021 |

OTHER PUBLICATIONS

Holbrook et al. ("The Use Of Petrophysical Data For Well Planning, Drilling Safety And Efficiency." Paper presented at the SPWLA 37th Annual Logging Symposium, New Orleans, Louisiana, Jun. 1996.) (Year: 1996).*

Macé et al. ("Integration of Fracture Data into 3D Geomechanical Modeling To Enhance Fractured Reservoirs Characterization." Paper presented at the SPE Annual Technical Conference and Exhibition, Dallas, Texas, Oct. 2005. doi: https://doi.org/10.2118/95827-MS) (Year: 2005).*

Lee et al. (Numerical analysis of sedimentary compaction: Implications for porosity and layer thickness variation. 54. 631-640. Dec. 2018, 10.14770/jgsk.2018.54.6.631) (Year: 2018).*

Allen and Allen "Basin Analysis, Principles and Applications to Petroleum Play Assessment, 3rd Edition" Wiley-Blackwell; 2013 (633 pages).

D. Marion et al. "Constraining 3D static models to seismic and sedimentological data: a further step towards reduction of uncertainties" Society of Petroleum Engineers; 65132; Paris, France; Oct. 24-25, 2000 (6 pages).

J.E. Atkins et al. "Porosity and packing of Holocene river, dune, and beach sands" AAPG bulletin, 76(3), Mar. 1992; pp. 339-355 (17 pages).

L.F. Athy "Density, Porosity, and Compaction of Sedimentary Rocks" AAPG Bulletin, vol. 14(1), pp. 1-24; Ponca City, Oklahoma; Jan. 1930 (24 pages).

G.P. Eberli et al. "Factors controlling elastic properties in carbonate sediments and rocks" The Leading Edge, 2 (7); Jul. 2003; pp. 654-660 (7 pages).

S.N. Erickson et al. "Velocity?porosity relationships for water? saturated siliciclastic sediments" Journal of Geophysical Research: Solid Earth, 103(B12); Dec. 10, 1998; pp. 30385-30406 (22 pages).

R.K. Goldhammer "Compaction and decompaction algorithms for sedimentary carbonates" Journal of Sedimentary Research, 67(1); Jan. 1997; pp. 26-35 (10 pages).

M.A. Nikolinakou et al. "Comparison of evolutionary and static modeling of stresses around a salt diapir" Marine and Petroleum Geology, 57; Jul. 11, 2014; pp. 537-545 (9 pages).

A.G. Nunns "Structural restoration of seismic and geologic sections in extensional regimes" AAPG bulletin, 75(2); Feb. 1991; pp. 278-297 (21 pages).

J. Obradors-Prats et al. "Assessing the implications of tectonic compaction on pore pressure using a coupled geomechanical approach" Marine and Petroleum Geology, 79; Oct. 27, 2016; pp. 31-43 (13 pages).

S.T. Paxton et al. "Construction of an intergranular volume compaction curve for evaluating and predicting compaction and porosity loss in rigid-grain sandstone reservoirs" AAPG bulletin, 86(12); Dec. 2002; pp. 2047-2067 (21 pages).

J.M. Segura et al. "Estimating drilling conditions based on forward modeling along wells, a case study including mechanical and chemical compaction" In 50th US Rock Mechanics/Geomechanics Symposium. American Rock Mechanics Association; Jun. 2016 (8 pages).

B. Velde "Compaction trends of clay-rich deep sea sediments" Marine Geology, 133(3-4); Paris, France; Feb. 28, 1996; pp. 193-201 (9 pages).

International Search Report and Written Opinion of the International Searching Authority issued in corresponding International Application No. PCT/US2022/026023, dated Jul. 8, 2022 (16 pages).

* cited by examiner

METHOD FOR VALIDATING ROCK FORMATIONS COMPACTION PARAMETERS USING GEOMECHANICAL MODELING

BACKGROUND

Operations, such as surveying, drilling, wireline testing, completions, production, planning and field analysis, are typically performed to locate and produce valuable hydrocarbons such as oil and gas. Surveys are often performed using acquisition methods such as seismic surveys to generate maps of underground formations. These formations are often analyzed to determine the presence of hydrocarbons and valuable minerals, or to determine if the formations have characteristics suitable for storing fluids.

Sedimentary basin modeling can predict if, and how, a reservoir has been charged with hydrocarbons, including the source and timing of hydrocarbon generation, migration paths, quantities, and hydrocarbon type. Sedimentary basin modeling includes the quantitative analysis and simulation of geological processes in sedimentary basins on a geological timescale. It further encompasses development of the basin geometry, heat and pore water flow modeling with regard to sediment compaction and basin subsidence or uplift, and the temperature-controlled chemistry of mineral and organic matter changes.

Geomechanics is the study of the way rocks compress, expand, and fracture. Over the geological timescale of a sedimentary basin, sediments are deposited, compacted, lithified, and deformed by tectonic events to produce layers of rocks with anisotropic and nonlinear mechanical characteristics. Where hydrocarbon reservoirs exist, the fluids they contain, the reservoir rocks themselves, and the formations that surround them form tightly coupled systems.

Geomechanical models use calculated pressure, temperature, and saturation to calculate the behavior of the formation rock through geologic time. By relating rock stresses to reservoir properties, the geomechanical model enables the development of mechanical earth models that predict the geomechanical behavior of the formation during production and stimulation fluid injection. The removal of hydrocarbons from a reservoir or the injection of fluids changes the rock stresses and geomechanics environment, potentially affecting compaction and subsidence, well and completion integrity, cap-rock and fault-seal integrity, fracture behavior, thermal recovery, and carbon dioxide disposal. Further, geomechanical models can provide faults stability and reactivation information throughout geological time, which is important for hydrocarbon migration and accumulation analysis.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method that includes, obtaining a measured present-day value of at least one parameter for each member of a set of unvalidated layers arranged in order of increasing present-day depth and iteratively selecting a member of the set as a current layer. For each current layer in turn, an estimated archaic value of at least one parameter of the current layer is determined based on its measured present-day value by applying an alternating cycle of decompaction modeling followed by geomechanical modeling to predict a present-day value of the parameter of the current layer based on its estimated archaic value. The method still further includes determining a validated archaic value of at least one parameter of each current layer based on a difference between the predicted and the measured present-day values.

In general, in one aspect, embodiments disclosed herein relate to a non-transitory computer readable medium storing instructions executable by a computer processor, the instructions including functionality for obtaining a measured present-day value of at least one parameter for each member of a set of at least one unvalidated layer arranged in order of increasing present-day depth in a subterranean sedimentary region of interest. The instructions further include functionality for selecting a member of the set of unvalidated layers as a first current layer and determining, by applying an alternating cycle of a decompaction modeling followed by geomechanical modeling, an estimated archaic value of the at least one parameter of the first current layer based on the measured present-day value of the at least one parameter of the first current layer. The instructions still further include functionality for predicting a predicted present-day value of the at least one parameter of the first current layer based on the estimated archaic value of the at least one parameter of the first current layer and determining a validated archaic value of the at least one parameter of the first current layer based on a difference between the predicted present-day value and the measured present-day value of the at least one parameter of the first current layer; adding the first current layer to a set of validated layers; and removing the first current layer from the set of unvalidated layers.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Reducing uncertainty in the reconstruction parameters when reconstructing ancient topography, also known as paleogeographic reconstruction, is important for predicting present-day hydrocarbon reservoir quality. The values of parameters describing the initial petrophysical and geomechanical properties of a sediment at the time of deposition, collectively described herein as "archaic parameter values", may be the largest source of uncertainty in paleogeographic reconstructions. The disclosed method describes a validation workflow for these archaic parameter values of a subsurface rock layers and the use of the resulting validated archaic parameter values.

Figure 1A:
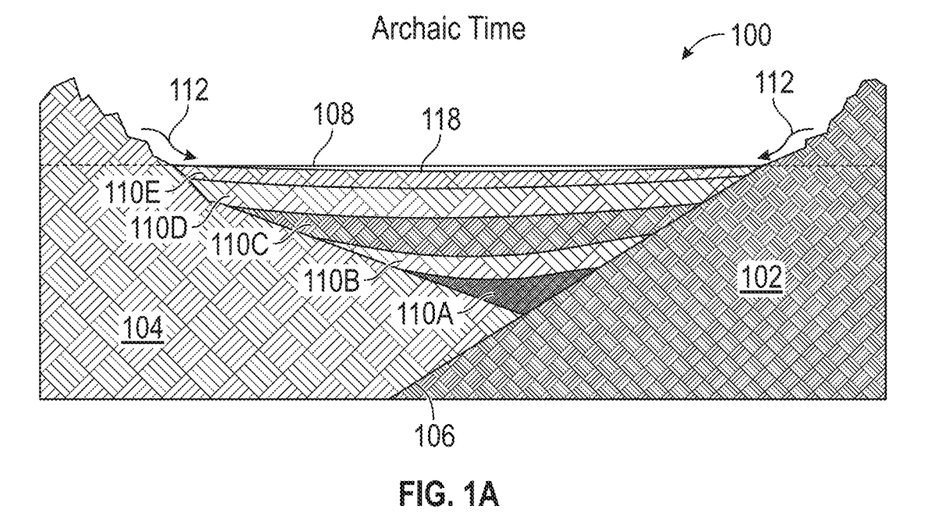
FIGS. 1A and 1B depict an example of a sedimentary basin at various geological times.
Figure 1B:
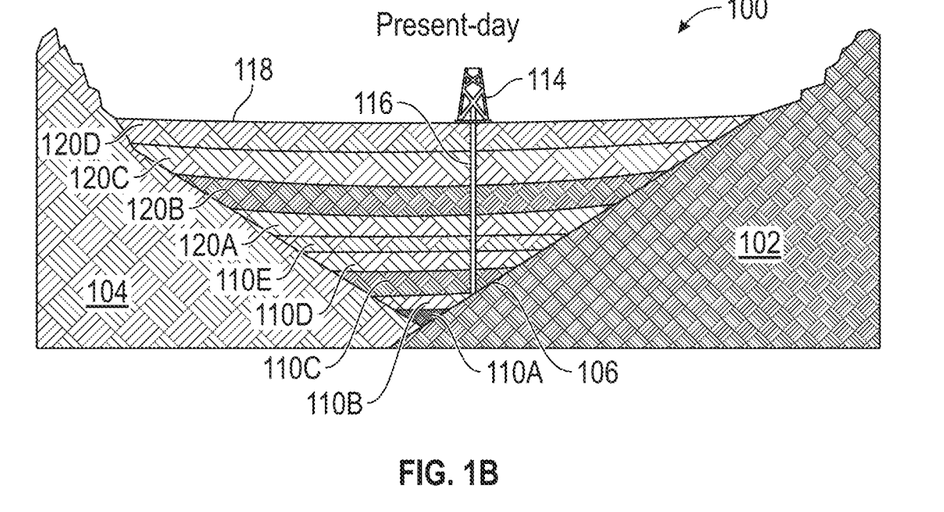

FIGS. 1A and 1B depict a cross-section of a single exemplary sedimentary basin (100), in accordance with one or more embodiments. In FIG. 1A the sedimentary basin (100) is depicted at an earlier geological time or "archaic time." This time may be many tens of millions of years before the present-day. The sedimentary basin (100) may comprise a pre-existing basement rock (102, 104). This basement rock (102, 104) may be an igneous rock, a metamorphic rock, or may be a preexisting sedimentary rock. In some embodiments, the basement rock may be divided into a first basement rock (102) and a second basement rock (104) separated by a geological fault (106). The first basement rock (102) and a second basement rock (104) may be of the same rock type or they may be of different rock types.

Within the sedimentary basement (100) flows of sediment (112) originating in surrounding regions may accumulate on the ground surface (118) of the sedimentary basin (100). The ground surface (118) of the sedimentary basin may be below sea level (108) as depicted in FIG. 1A, in which case the sedimentary basin may be filled with seawater. In other cases, the ground surface (118) of the sedimentary basin (100) may be partially or wholly occupied by a lake or by a river system, or by any combination of river, lake and sea. At the archaic time the sedimentary basin (100) may be filled by a plurality of sedimentary layers (110A, 110B, 110C, 110D, 110E) deposited at earlier times during the creation and earlier history of the sedimentary basin (100). Different types of rock layers may be created by different environmental conditions during their deposition. For example, without limitation, fine-grained mudstone may be deposited in deep water, sandstone with uniform grain sizes may be deposited in beach or shallow water environments, shales or coals may be deposited in marsh or swamp environments, and coarse-grained conglomerates may be deposited in fast-flowing river environments.

Different types of rock may have different petrophysical and geomechanical properties at the time they are deposited. Even rock categorized as the same, such as sandstone, may have petrophysical and geomechanical properties that differ from other samples of the same type. For example, one sandstone may have 40% porosity while another sandstone may have only 26% porosity. Petrophysical properties may include, without limitation, porosity, permeability and total organic content. Geomechanical properties may include, without limitation, Young's modulus, Poisson's ratio, bulk modulus, compaction coefficient and friction angle.

Over a geological timescale a sedimentary basin may evolve. In particular, a sedimentary basin may deepen and additional sedimentary layers may be deposited above those that existed at an archaic time shown in FIG. 1A. For example, the sedimentary basin may deepen because the underlying basement blocks may be pulled apart from one another by tectonic forces, or the basement rocks may cool causing their density to increase and the basement rocks to settle deeper. In such cases, the flows of sediment into the sedimentary basin may deposit additional sedimentary layers burying the archaic sedimentary layers to greater depths and compressing them under greater pressures.

FIG. 1B depicts the exemplary cross-section of the present-day sedimentary basin. Sedimentary layers (120A, 120B, 120C, 120D) deposited between the archaic time, depicted in FIG. 1A, and the present-day, depicted in FIG. 1B, may cause alteration of the petrophysical and geomechanical property values of the underlying archaic sedimentary layers. For example, the compaction of the underlying sedimentary layers may cause a reduction in porosity as depicted in FIG. 2A and 2B.

Figure 2A:
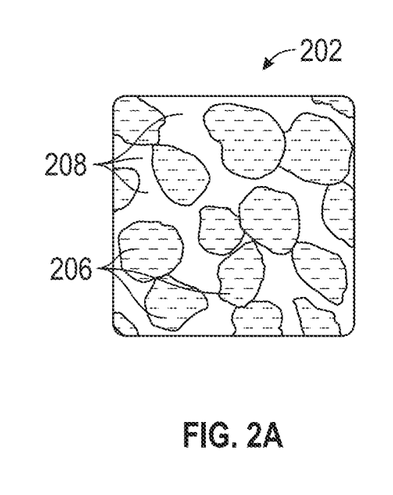
FIGS. 2A and 2B depict pores and grains within a rock in accordance with one or more embodiments.

FIG. 2A depicts a cross-section through a sample rock core (202) taken from a sedimentary layer. A portion of the rock core (202) is composed of solid grains (206) but between and around the solid grains (206) is a portion of empty space (208) called "pores". The porosity of a rock is the volume fraction, usually expressed as a percentage of the total rock core volume, composed of pores. Prior to the removable of the rock core (202) from the sedimentary layer the pores may be filled with gas, including natural gas or methane, or with liquids such as oil, fresh water or brine.

Figure 2B:
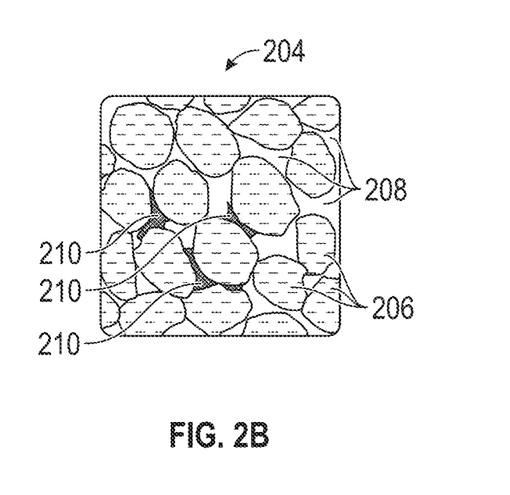

Over geological time, compaction by the weight of overlying layers may reduce the porosity of a sedimentary layer as depicted in FIG. 2B. The reduction of the porosity may be the result of physical processes, such as elastic or plastic deformation of the solid grains (206), or mechanical failure, i.e., the breaking of grains. In addition, the reduction of the porosity may be the result of chemical processes, such as the dissolution and/or deposition of minerals (210) or the transformation portions of grains from one mineral to another denser and more compact mineral. Further, the reduction in porosity may be a result of biological processes, such as the bacterial fermentation of organic matter.

Figure 3:
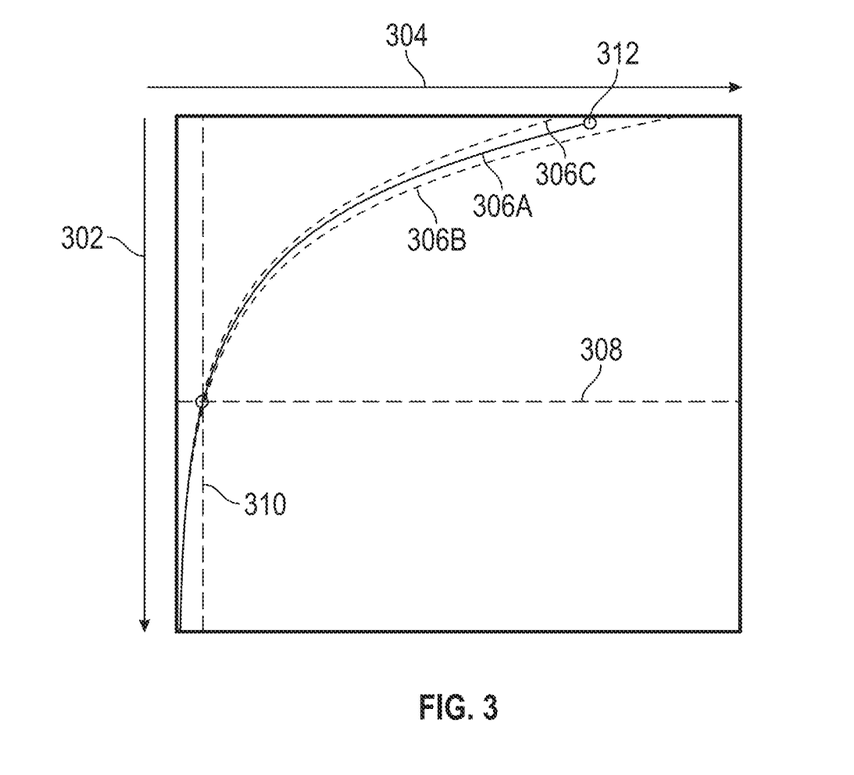
FIG. 3 shows a compaction curve in accordance with one or more embodiments.

FIG. 3 shows exemplary compaction curves (306A, 306B, 306C), in accordance with one or more embodiments. The compaction curves (306A, 306B, 306C) show the reduction of the value of porosity, shown on the horizontal axis (304), with depth, shown on the vertical axis (302). The typical porosity of a sedimentary layer at the time of its deposition lies in the range 30%-70%. Compaction curves typically exhibit exponential decay with increasing depth with porosity, φ, given by:

$$\varphi(z) = \varphi(0) e^{-z/c}. \qquad \text{Equation (1)}$$

where z is the depth below the surface, φ(0) is the archaic value of porosity (312) of the sedimentary layer, i.e., the value of porosity at the time of deposition, and c is a compaction coefficient.

The solid compaction curve may describe the behavior of an exemplary sandstone with compaction coefficient, c, of 1000 and an archaic value of porosity, $\varphi(0)=44\%$. Once c and $\varphi(0)$ are specified, equation (1) predicts the expected present-day porosity the sedimentary layer will have after burial to a depth z. Conversely, if the present-day value of porosity, $\varphi(z)$, of a sedimentary layer at a depth z is measured using a wireline tool or by retrieving a rock core, the archaic value of porosity at the time of deposition may be estimated using:

$$\varphi(0)=\varphi(z)e^{z/c}.$$ Equation (2)

However, equation (2) predicts different archaic values of porosity, $\varphi(0)$, for different values of c. For example, the compaction curve (306B) corresponding to a larger archaic value of porosity, $\varphi(0)$, and a smaller value of compaction coefficient, c, predicts the same present-day porosity $\varphi(z)$ at depth z, as does the compaction curve (306C) corresponding to a smaller archaic value of porosity, $\varphi(0)$, a larger value of compaction coefficient, c. For each sedimentary layer or lithology many pairs of compaction coefficient and porosity at the time of deposition predict the same observed present-day porosity (310) at the present-day depth (308) or the sedimentary layer.

The exponential decay compaction curve (306A) shown in FIG. 3 depicts an empirical method of predicting archaic values of the porosity of a sedimentary layer. However, applying the exponential decay compaction curve (306A) requires the empirical estimation of the compaction coefficient and does not predict present-day or archaic values of stresses or displacements of the sedimentary layers.

Forward geomechanical modeling is a physics-based numerical modeling technique that can entail simulation of changes in stress and strain in a rock layer from deposition at archaic times to the present-day. The finite element method is commonly utilized with a non-linear porosity and stress state-dependent function to simulate compaction as described in "*Comparison of evolutionary and static modeling of stresses around a salt diapir*", Nikolinakou, M. A., Hudec, M. R. and Flemings, P. B., 2014, *Marine and Petroleum Geology*, 57, pp537-545; "*Estimating drilling conditions based on forward modeling along wells, a case study including mechanical and chemical compaction*", Segura, J. M., Diez, J., Alvarellos, J., Polo, T., Moss, C., Kean, A. E. and Lakshmikantha, M. R., 2016, 50*th US Rock Mechanics/Geomechanics Symposium. American Rock Mechanics Association;* and "*Assessing the implications of tectonic compaction on pore pressure using a coupled geomechanical approach*", Obradors-Prats, J., Rouainia, M., Aplin, A. C. and Crook, A. J., 2017, *Marine and Petroleum Geology*, 79, pp31-43.

Figure 4:
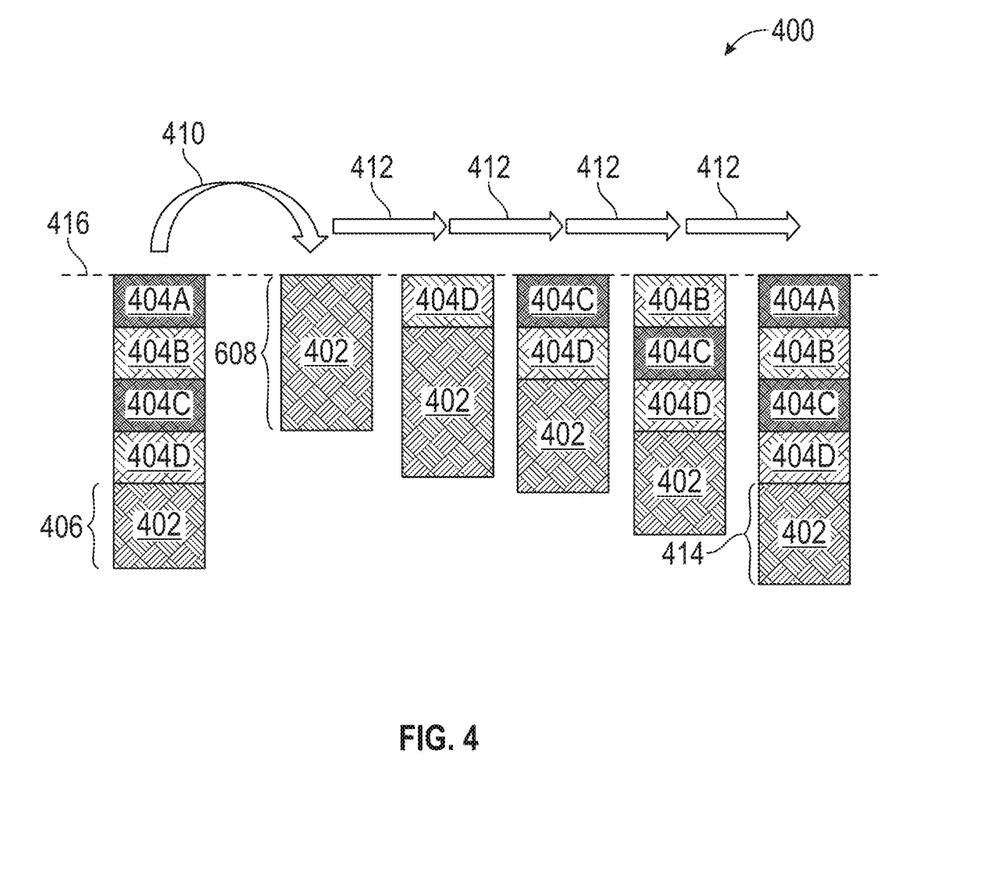
FIG. 4 shows a flowchart in accordance with one or more embodiments.

FIG. 4 depicts a cycle of a decompaction modeling followed by a geomechanical modeling (400), in accordance with one or more embodiments. The cycle begins by identifying a sedimentary layer of interest, denoted the "current layer" (402). The current layer (402) is characterized by at least a present-day depth, a present-day thickness (406) and a present-day porosity determined, at least in part from a seismic survey and well logs recorded in a wellbore traversing the current layer (402). The current layer (402) may lie beneath one or more overburden layers (404A, 404B, 404B, 404D) which were deposited at more recent archaic times than the current layer (402).

In accordance with one or more embodiments, the next step in the cycle performs a decompaction modeling (410) using a decompaction curve (306A) to determine the archaic value of the thickness (608) of the current layer (402) at the time of its deposition. The decompaction modeling is followed by a series of geomechanical modeling steps (412), each simulating the effect of sequentially adding an overburden layer beginning with the deepest overburden layer (404D) and culminating with the shallowest overburden layer (404A). The geomechanical modeling involves gradually equilibrating the current layer (402) and the overburden layers with gravitational forces resulting in the compaction of the layers and the computation of the associated displacements and stresses. After the deposition of all overburden layers (404A, 404B, 404B, 404D) have been simulated by geomechanical modeling the predicted present-day value of the thickness (414) and the present-day value of the porosity of the current layer (402) may be determined.

The geoemechanical modeling results are heavily dependent on archaic petrophysical and geomechanical property values of the current layer (402) such as porosity, Young's modulus, bulk modulus, and Poisson's ratio. The archaic values of these parameters are initially poorly known, and they are typically the greatest sources of uncertainty in the decompaction and geomechanical modeling cycle. Thus, the measured present-day values of these properties, obtained from seismic, well log, and core measurements are in general different from the predicted present-day values after one cycle of decompaction modeling followed by geomechanical modeling (400) and iterative cycles of decompaction modeling followed by geomechanical modeling may be required to achieve self-consistent values of the archaic parameters of the current layer (402).

Figure 5:
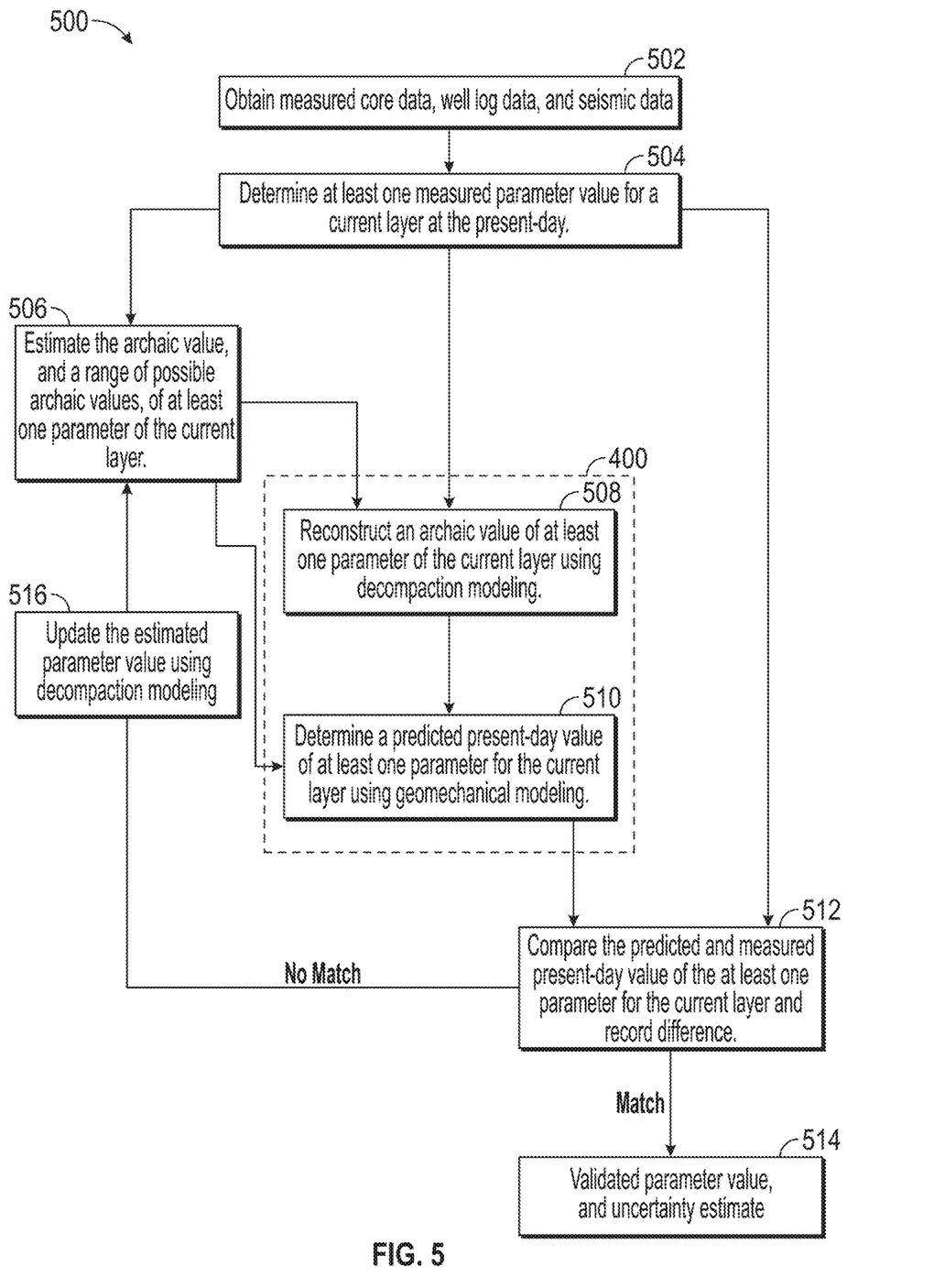
FIG. 5 shows a flowchart in accordance with one or more embodiments.

FIG. 5 depicts a flowchart (500) for the determination of validated archaic values of petrophysical and geomechanical parameters for a current layer (402), in accordance with one or more embodiments. In Step 502, measured well log data and seismic data may be obtained. Furthermore, in some embodiments, core data may also be obtained. In Step 504, measured present-day value of one or more parameter values of the current layer (402) may be determined based, at least in part, on the well log data, seismic data, and in some cases core data. The one or more parameters may be chosen from the lithology, the layer thickness, the porosity, the Young's modulus, the bulk modulus, and the Poisson's ratio of the current layer (402).

In Step 506, an initial archaic value, together with a range of possible archaic values, may be estimated for at least one parameter for the current layer (402). The estimation may be based, at least in part on the measured present-day values of the parameters for the current layer (402). These parameters may include archaic values of a compaction coefficient, the depth of the layer surface, the layer thickness, the porosity, the Young's modulus, the bulk modulus, and the Poisson's ratio of the current layer (402). The estimates may be based on laboratory experiments, and modern geological analogues and reported values from the scientific literature. However, in general, these estimates may be inaccurate and have large uncertainties.

In Step 508, an archaic value of at least one parameter of the current layer (402) may be reconstructed using decompaction modeling, in accordance with one or more embodiment. The at least one parameter may include a compaction depth of the current layer's surface, the thickness, the porosity, the Young's modulus, the bulk modulus, and the Poisson's ratio of the current layer (402). In Step 510, a predicted present-day value of at least one parameter for the current layer (402) may be determined using geomechanical modeling. The predicted present-day value may be based upon the estimate of the archaic value and the range of possible archaic values, of at least one parameter of the current layer (402). Taken together, Step 508 and Step 510 constitute one cycle (400) of decompaction modeling followed by geomechanical modeling depicted in FIG. 4.

In Step 512, in accordance with one or more embodiments, the difference between the predicted and measured present-day value of the at least one parameter for the current layer (402) may be determined and the difference recorded. The difference may be an arithmetic difference or may be a function of the arithmetic difference, such as a power of the arithmetic difference or a polynomial of an arithmetic difference without departing form the scope of the invention.

If the difference between the measured and predicted present-day values do not satisfy a convergence criterion, then the estimated archaic values of at least one parameter of the current layer (402) may be updated in Step 516. The update may be performed by a statistical method or a deterministic method. The update may be performed using an inversion method or may involve an exhaustive search of all the values falling withing the range of possible archaic values. The update may involve the minimizing an objective function using any one of a number of algorithms, such as conjugate gradient or simulated annealing, familiar to one of ordinary skill in the art. The update may be performed entirely automatically using a computer, or may be performed manually by an operator, or may involve both manual and automatic elements. The updated archaic value of the at least one parameter of the current layer (402) may then be used in another iteration of Steps 508, 510, and 512.

If the difference determined in Step 512 satisfies a convergence criterion, such as the value of the difference falling below a predetermined value or the ratio of the difference to the measured present-day value falling below a predetermined level, then the predicted and measured present-day value may be determined to match. For example, when the difference divided by the measured present-day value falls below a predetermined value of 5% a satisfactory match may be determined, in accordance with one or more embodiments.

In Step 514, in accordance with one or more embodiments, when the convergence criterion is met, the latest iterative estimate of the archaic value of the at least one parameter of the current layer (402) may be determined to be the validated archaic value of the at least one parameter. Furthermore, the differences between the measured and predicted present-day values recorded during preceding iterations in Step 512 may be used to determine the uncertainty in the validated archaic values. For example, if values of the archaic parameters similar to the validated value produce much larger differences, the validated archaic parameters may be determined with low uncertainty. On the other hand, if values of the archaic parameters similar to the validated value produce very similar differences, the validated archaic parameters may be determined with high uncertainty.

Figure 6:
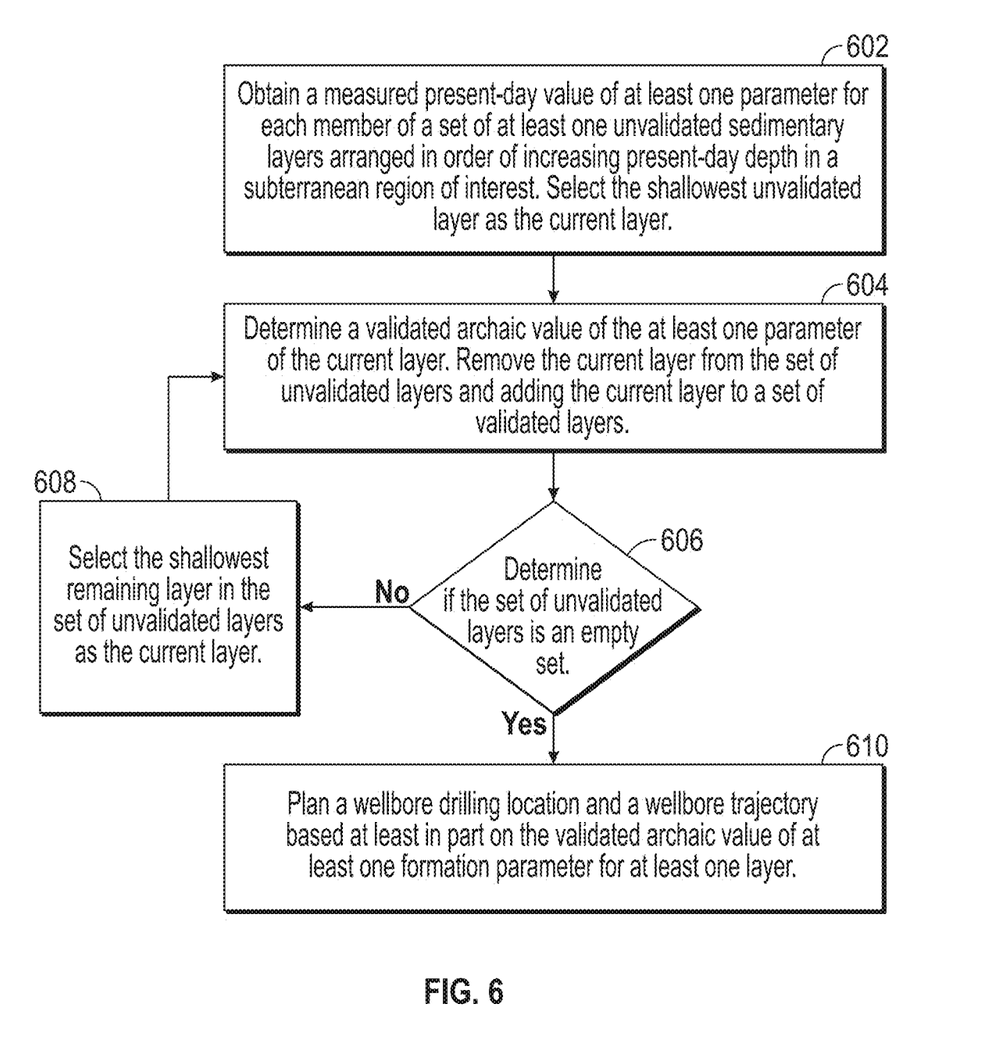
FIG. 6 shows a flowchart in accordance with one or more embodiments.

The flowchart (500) depicted in FIG. 5 shows the process for determining at least one validated archaic parameter for a current layer (402). FIG. 6 shows a flowchart, in accordance with one or more embodiments, for determining at least one validated archaic parameter for each of a plurality of layers.

In Step 602, a measured present-day value of at least one parameter for each member of a set of at least one unvalidated sedimentary layers is obtained. The set of unvalidated layers may be arranged in order of increasing present-day depth below the Earth's surface (118). Further, in Step 602, the shallowest unvalidated layer is selected as the current layer (402).

In Step 604, a validated archaic value of the at least one parameter of the current layer (402) selected in Step 602 is determined using the workflow (500) disclosed in FIG. 5. Furthermore, in Step 604 the current layer (402) may be removed from the set of unvalidated layers and added the current layer (402) to a set of validated layers.

In Step 606, in accordance with one or more embodiments, the set of unvalidated layers may be examined to determine if it is an empty set, indicating that a validated archaic value of the at least one parameter has been determined for all the layers initially in the set of unvalidated layers. If layers remain in the set of unvalidated layers, then the shallowest unvalidated layer may be selected in Step 608 as the current layer, and Step 604 repeated for the new current layer.

However, if it is determined in Step 606 that no remaining layer remain in the set of unvalidated layers then the workflow moves on to Step 610, in accordance with one or more embodiments. In Step 610, the validated archaic value of at least one formation parameter for at least one layer in the set of validated layers may be used to determine the presence of hydrocarbons in the layer and to determine one or more locations for drilling a borehole and for determining the borehole trajectory. For example, the validated archaic value of porosity may be used to reduce the risk associated with predicted parameter values, such as present-day porosity values in subterranean regions not penetrated by existing wells. In addition, the validated archaic topography may be used to identify regions where sediments with high kerogen, i.e., good hydrocarbon source rocks, may be located or where stratigraphic hydrocarbon traps, such as archaic reefs, may be positioned.

Figure 7A:
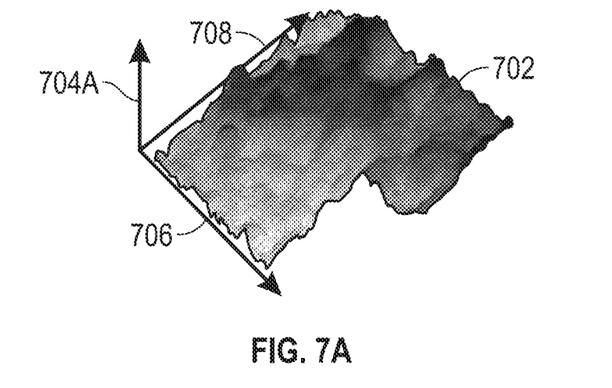
FIGS. 7A-7E show an example of a workflow in accordance with one or more embodiments
Figure 7B:
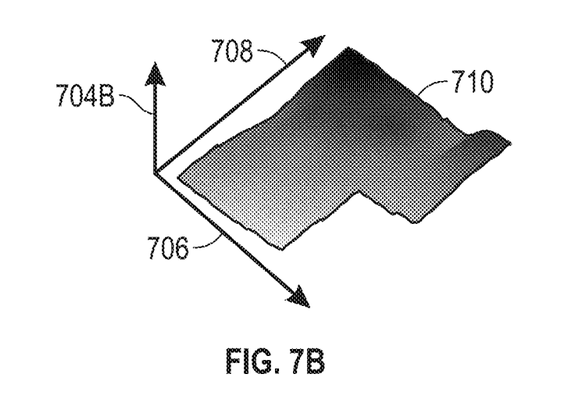
Figure 7C:
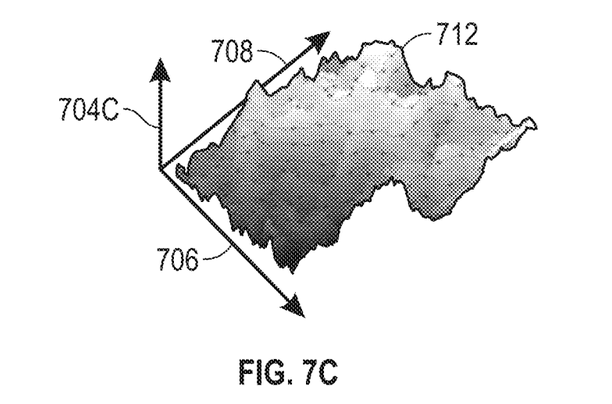

FIGS. 7A-7E show intermediate results of the workflow shown in FIG. 4, in accordance with one or more embodiments, to create a paleo-topographic surface. FIG. 7A shows the decompacted thickness (702) of the layer of interest indicated on the vertical thickness axis (704A) for each horizontal spatial position indicated on the orthogonal axes (706) and (708). This decompacted thickness (702) is a result of applying Equation (1) to the present-day thickness and depth of the upper surface of the current layer for each location. FIG. 7B shows a relief map (710) with which this decompacted thickness map may be combined. The vertical axis (704B) shows the elevation of each point on the relief map (710). The relief map (710) shows the elevation of the surface on which the layer of interest was deposited in archaic times and may be based, at least in part, on a Gross Depositional Environment (GDE) map for the region of interest. FIG. 7C shows a relative topographic relief map of the archaic upper surface (712) of the current layer after decompaction modeling produced by combining the decompaction thickness map (702) and the relief map (710). The vertical axis (704C) of FIG. 7C shows the relative elevation of the upper surface of the layer of interest at the archaic time at which deposition of the layer ended.

Figure 7D:
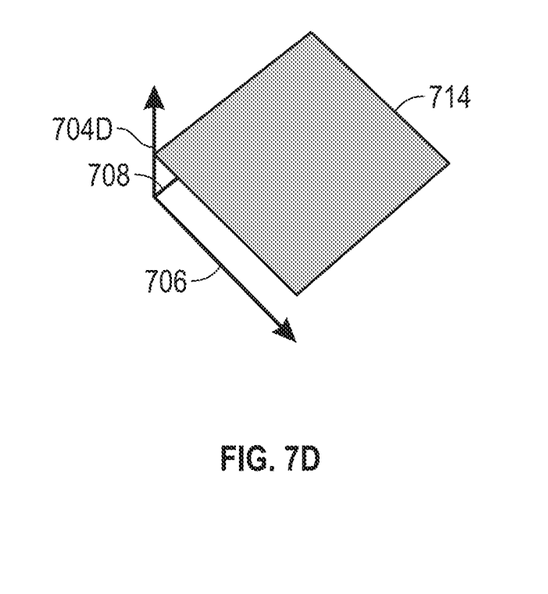
Figure 7E:
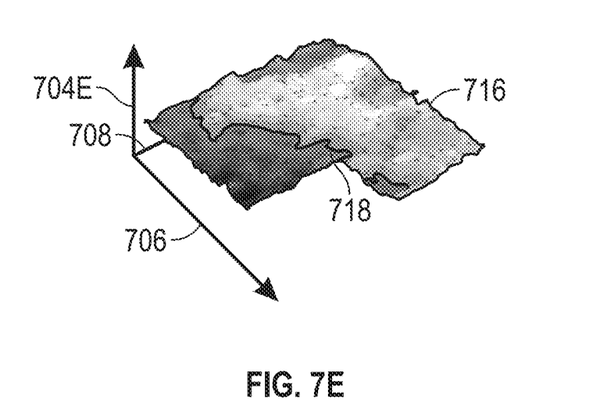

FIG. 7D shows a uniform vertical shift (714), indicated on the vertical axis (704D), of the relative topographic surface with respect to archaic sea-level that may be combined with the relative topographic relief map (712) to determine an archaic topographic relief map with respect to archaic sea-level (716). Elevation with respect to archaic sea-level is shown on the vertical axis (704E). Further. 7E further shows the archaic coastline position (718).

Figure 8:
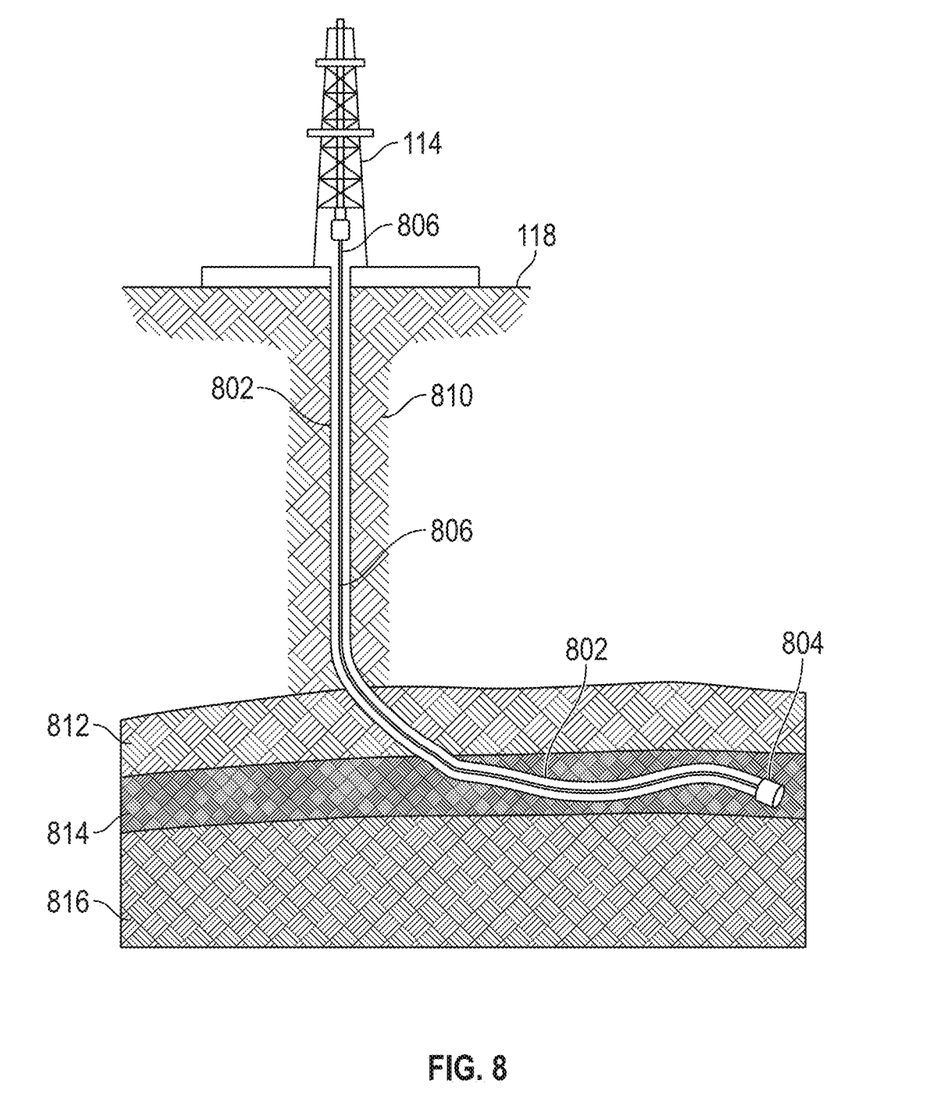
FIG. 8 shows a computer system in accordance with one or more embodiments.

FIG. 8 illustrates systems in accordance with one or more embodiments. As shown in FIG. 8, a borehole (802) may be drilled by a drill bit (804) attached to a drillstring (806) to a drill rig (114) located on the Earth's surface (118). The borehole may traverse a plurality of overburden layers (810) and one or more cap-rock layers (812) to a hydrocarbon reservoir (814) lying above an underburden (816) that may be an aquifer containing fresh water or brine. The determination of a suitable location and trajectory of the borehole (802) may be based, at least in part, upon the archaic values of the parameters of the sedimentary layers containing the hydrocarbon reservoir (814), the overburden (812), and the underburden (816).

Figure 9:
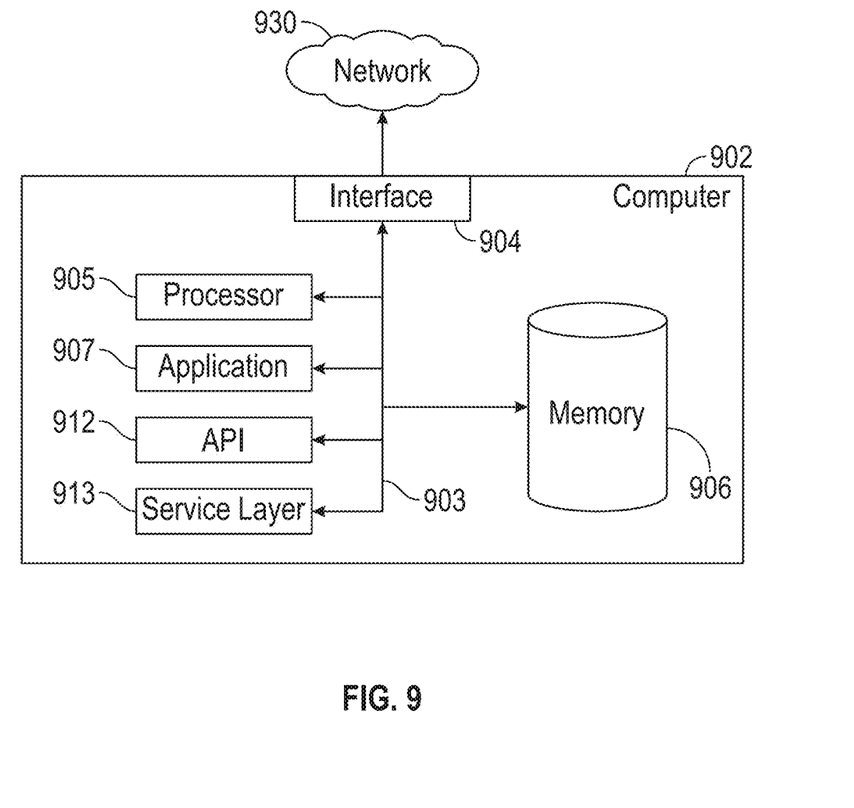
FIG. 9 shows a system in accordance with one or more embodiments.

FIG. 9 further depicts a block diagram of a computer system (902) used to provide computational functionalities associated with described algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 12, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method, comprising:
   obtaining a measured present-day value of at least one parameter for each member of a set of unvalidated layers arranged in order of increasing present-day depth in a subterranean sedimentary region of interest;
   selecting, using a computer processor, a member of the set of unvalidated layers as a first current layer;
   determining, using the computer processor, an estimated archaic value of the at least one parameter of the first current layer based, at least in part, on the measured present-day value of the at least one parameter of the first current layer,
      wherein determining the estimated archaic value comprises applying an iterative cycle of decompaction modeling followed by geomechanical modeling, wherein the geomechanical modeling comprises finite element modeling and wherein the geomechanical modeling comprises temperature and chemical changes;
   predicting, using the computer processor, a predicted present-day value of the at least one parameter of the first current layer using forward geomechanical modeling, based, at least in part, on the estimated archaic value and the range of possible archaic values of the at least one parameter of the first current layer;
   determining, using the computer processor, a validated archaic value of the at least one parameter of the first current layer based, at least in part, on a difference between the predicted present-day value and the measured present-day value of the at least one parameter of the first current layer;
   adding, using the computer processor, the first current layer to a set of validated layers;
   removing, using the computer processor, the first current layer from the set of unvalidated layers;
   determining, by the computer processor, a presence of a hydrocarbon reservoir based, at least in part, on the validated archaic value of the at least one parameter,
   determining, by the computer processor, a borehole trajectory through the subterranean region of interest based, at least in part, on the presence of the hydrocarbon reservoir; and
   drilling the borehole-trajectory using a drilling system.

2. The method of claim 1, wherein the member of the set of unvalidated layers selected as the first current layer has a shallowest present-day depth among the set of unvalidated layers.

3. The method of claim 1, further comprising:
   using a computer processor:
   selecting another member of the set of unvalidated layers as a second current layer;
   determining an estimated archaic value of the at least one parameter of the second current layer based, at least in part, on the measured present-day value of the at least one parameter of the second current layer,
      wherein determining the estimated archaic value comprises applying an alternating cycle of decompaction modeling followed by geomechanical modeling;
   predicting a predicted present-day value of the at least one parameter of the second current layer based, at least in part, on the estimated archaic value of the at least one parameter of the current layer;
   determining a validated archaic value of the at least one parameter of the second current layer based, at least in part, on a difference between the predicted present-day value and the measured present-day value of the at least one parameter of the second current layer;
   adding the second current layer to the set of validated layers; and
   removing the second current layer from the set of unvalidated layers.

4. The method of claim 1, wherein determining, by the computer processor, the validated archaic value of the at least one parameter comprises determining an uncertainty of the validated archaic value of the at least one parameter based, at least in part, on the difference between the predicted present-day value and the measured present-day value of the at least one parameter.

5. The method of claim 1, wherein decompaction modeling comprises using an estimated compaction coefficient and an exponential compaction curve.

6. The method of claim 1, wherein geomechanical modeling comprises calculating a compaction of the first current layer resulting from a weight of each layer of an overburden.

7. The method of claim 1, wherein geomechanical modeling comprises calculating a stress history and a strain history of the first current layer.

8. The method of claim 1, wherein determining the estimated archaic value of the formation comprises applying an inversion method.

9. A non-transitory computer readable medium storing instructions executable by a computer processor, the instructions comprising functionality for:
   obtaining a measured present-day value of at least one parameter for each member of a set of at least one unvalidated layer arranged in order of increasing present-day depth in a subterranean sedimentary region of interest;

selecting a member of the set of unvalidated layers as a first current layer;

determining, by applying an iterative cycle of a decompaction modeling followed by geomechanical modeling, an estimated archaic value of the at least one parameter of the first current layer based, at least in part, on the measured present-day value of the at least one parameter of the first current layer,
wherein the geomechanical modeling comprises finite element modeling and wherein geomechanical modeling comprises temperature and chemical changes;

predicting a predicted present-day value of the at least one parameter of the first current layer using forward geomechanical modeling based, at least in part, on the estimated archaic value and the range of possible archaic values of the at least one parameter of the first current layer;

determining a validated archaic value of the at least one parameter of the first current layer based, at least in part on a difference between the predicted present-day value and the measured present-day value of the at least one parameter of the first current layer;

adding the first current layer to a set of validated layers;

removing the first current layer from the set of unvalidated layers;

determining a presence of a hydrocarbon reservoir based, at least in part, on the validated archaic value of the at least one parameter; and determining a borehole trajectory through the subterranean region of interest based, at least in part, on the presence of the hydrocarbon reservoir.

10. The non-transitory computer readable medium of claim 9, wherein the member of the set of unvalidated layers selected as the first current layer has a shallowest present-day depth among the set of unvalidated layers.

11. The non-transitory computer readable medium of claim 9, the instructions further comprising functionality for:

selecting another member of the set of unvalidated layers as a second current layer;

determining, by applying an alternating cycle of a decompaction modeling followed by geomechanical modeling, an estimated archaic value of the at least one parameter of the second current layer based, at least in part, on the measured present-day value of the at least one parameter of the second current layer;

predicting a predicted present-day value of the at least one parameter of the second current layer based, at least in part, on the estimated archaic value of the at least one parameter of the second current layer;

determining a validated archaic value of the at least one parameter of the second current layer based, at least in part on a difference between the predicted present-day value and the measured present-day value of the at least one parameter of the second current layer;

adding the second current layer to a set of validated layers; and removing the second current layer from the set of unvalidated layers.

12. The non-transitory computer readable medium of claim 9, wherein determining the validated archaic value of the at least one parameter comprises determining an uncertainty of the validated archaic value of the at least one parameter based, at least in part, on the difference between the predicted present-day value and the measured present-day value of the at least one parameter.

13. The non-transitory computer readable medium of claim 9, wherein decompaction modeling comprises using an estimated compaction coefficient and an exponential compaction curve.

14. The non-transitory computer readable medium of claim 9, wherein geomechanical modeling comprises calculating a compaction of the first current layer resulting from a weight of each layer of an overburden.

15. The non-transitory computer readable medium of claim 9, wherein geomechanical modeling comprises calculating a stress history and a strain history of the current layer.

16. The non-transitory computer readable medium of claim 9, wherein determining the estimated archaic value of the formation comprises applying an inversion method.

* * * * *